US011533351B2

(12) United States Patent
Noorkami et al.

(10) Patent No.: US 11,533,351 B2
(45) Date of Patent: Dec. 20, 2022

(54) EFFICIENT DELIVERY OF MULTI-CAMERA INTERACTIVE CONTENT

(71) Applicant: Apple Inc., Cupertino, CA (US)

(72) Inventors: Maneli Noorkami, Menlo Park, CA (US); Ranjit Desai, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/320,199

(22) Filed: May 13, 2021

(65) Prior Publication Data

US 2022/0094732 A1 Mar. 24, 2022

Related U.S. Application Data

(60) Provisional application No. 63/083,093, filed on Sep. 24, 2020.

(51) Int. Cl.
*H04L 29/06* (2006.01)
*H04L 65/70* (2022.01)
(Continued)

(52) U.S. Cl.
CPC .......... *H04L 65/70* (2022.05); *G02B 27/0093* (2013.01); *G02B 27/017* (2013.01);
(Continued)

(58) Field of Classification Search
CPC ..... H04L 65/70; H04L 65/75; G02B 27/0093; G02B 27/017; G02B 2027/0138; G02B 2027/014
See application file for complete search history.

(56) References Cited

U.S. PATENT DOCUMENTS 9,158,375 B2 10/2015 Maizels et al.
9,383,582 B2 7/2016 Tang et al.
(Continued)

FOREIGN PATENT DOCUMENTS

EP 2257046 A2 12/2010
EP 2824884 A1 1/2015
(Continued)

OTHER PUBLICATIONS

International Search Report and Written Opinion in PCT Appl. No. PCT/US2021/043763 dated Oct. 27, 2021, 16 pages.
(Continued)

*Primary Examiner* — Kostas J Katsikis
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to encoding recorded content for distribution to other computing devices. In various embodiments, a first computing device records content of a physical environment in which the first computing device is located, the content being deliverable to a second computing device configured to present a corresponding environment based on the recorded content and content recorded by one or more additional computing devices. The first computing device determines a location of the first computing device within the physical environment and encodes the location in a manifest usable to stream the content recorded by the first computing device to the second computing device. The encoded location is usable by the second computing device to determine whether to stream the content recorded by the first computing device.

20 Claims, 7 Drawing Sheets

Method 560

Receive, from First Computing Device, Request to Stream Content Recorded of Physical Environment 565

In Response to Request, Provide Manifest Usable to Stream Content Recorded by Second Computing Device and Including Location Information Identifying Location of Second Computing Device Within Physical Environment 570

Receive Request to Provide Segments of Recorded Content Selected Based on Identified Location and Location Where User of First Computing Device Views Content Within Corresponding Environment 575

Provide Selected Segments to First Computing Device 580

(51) Int. Cl.

| | |
|---|---|
| ***G06T 7/70*** | (2017.01) |
| ***G02B 27/01*** | (2006.01) |
| ***G02B 27/00*** | (2006.01) |
| ***H04L 65/75*** | (2022.01) |

(52) U.S. Cl.

CPC ................ *G06T 7/70* (2017.01); *H04L 65/75* (2022.05); *G02B 2027/014* (2013.01); *G02B 2027/0138* (2013.01)

(56) References Cited

U.S. PATENT DOCUMENTS

| | | | |
|---|---|---|---|
| 9,488,488 | B2 | 11/2016 | Waldman |
| 9,685,004 | B2 | 6/2017 | Wang et al. |
| 11,025,919 | B2 * | 6/2021 | da Silva Pratas Gabriel .............. H04N 19/162 |
| 11,032,570 | B2 * | 6/2021 | Fan .................. H04N 21/85406 |
| 11,270,116 | B2 * | 3/2022 | Oser ...................... G06V 20/20 |
| 2016/0203648 | A1 | 7/2016 | Bilbrey et al. |
| 2016/0360180 | A1 | 12/2016 | Cole et al. |
| 2017/0347026 | A1 * | 11/2017 | Hannuksela ............ H04L 65/80 |
| 2018/0027181 | A1 | 1/2018 | Roulet et al. |
| 2018/0342043 | A1 | 11/2018 | Vandrotti et al. |
| 2019/0253747 | A1 * | 8/2019 | Ramaswamy ....... H04N 21/431 |
| 2020/0186780 | A1 * | 6/2020 | Tsukagoshi .......... H04N 21/434 |
| 2020/0312005 | A1 | 10/2020 | Desai et al. |

FOREIGN PATENT DOCUMENTS

| | | | |
|---|---|---|---|
| EP | 2824885 | A1 | 1/2015 |
| EP | 3668092 | A1 | 6/2020 |
| GB | 2567012 | A | 4/2019 |
| WO | 2014105264 | | 7/2014 |
| WO | 2019/195101 | A1 | 10/2019 |

OTHER PUBLICATIONS

Schneider et al., "Augmented Reality based on Edge Computing using the example of Remote Live Support," 2017 IEEE International Conference on Industrial Technology, Mar. 22, 2017, pp. 1277-1282.

"Potential improvement for OMAF," 131. MPEG Meeting; Online (Motion Picture Expert Group or ISO/IEC JTC1/SC29/WG11), No. n19435, Jul. 30, 2020, whole document.

* cited by examiner

EFFICIENT DELIVERY OF MULTI-CAMERA INTERACTIVE CONTENT

The present application claims priority to U.S. Prov. Appl. No. 63/083,093, filed Sep. 24, 2020, which is incorporated by reference herein in its entirety.

BACKGROUND

Technical Field

This disclosure relates generally to computing systems, and, more specifically, to encoding recorded content for distribution to other computing devices.

Description of the Related Art

Various streaming services have become popular as they provide a user the opportunity to stream content to a variety of devices and in a variety of conditions. To support this ability, various streaming protocols, such as MPEG-DASH and HLS, have been developed to account for these differing circumstances. These protocols work by breaking up content into multiple segments and encoding the segments in different formats that vary in levels of quality. When a user wants to stream content to a mobile device with a small screen and an unreliable network connection, the device might initially download video segments encoded in a format having a lower resolution. If the network connection improves, the mobile device may then switch to downloading video segments encoded in another format having a higher resolution and/or higher bitrate.

Figure 1:
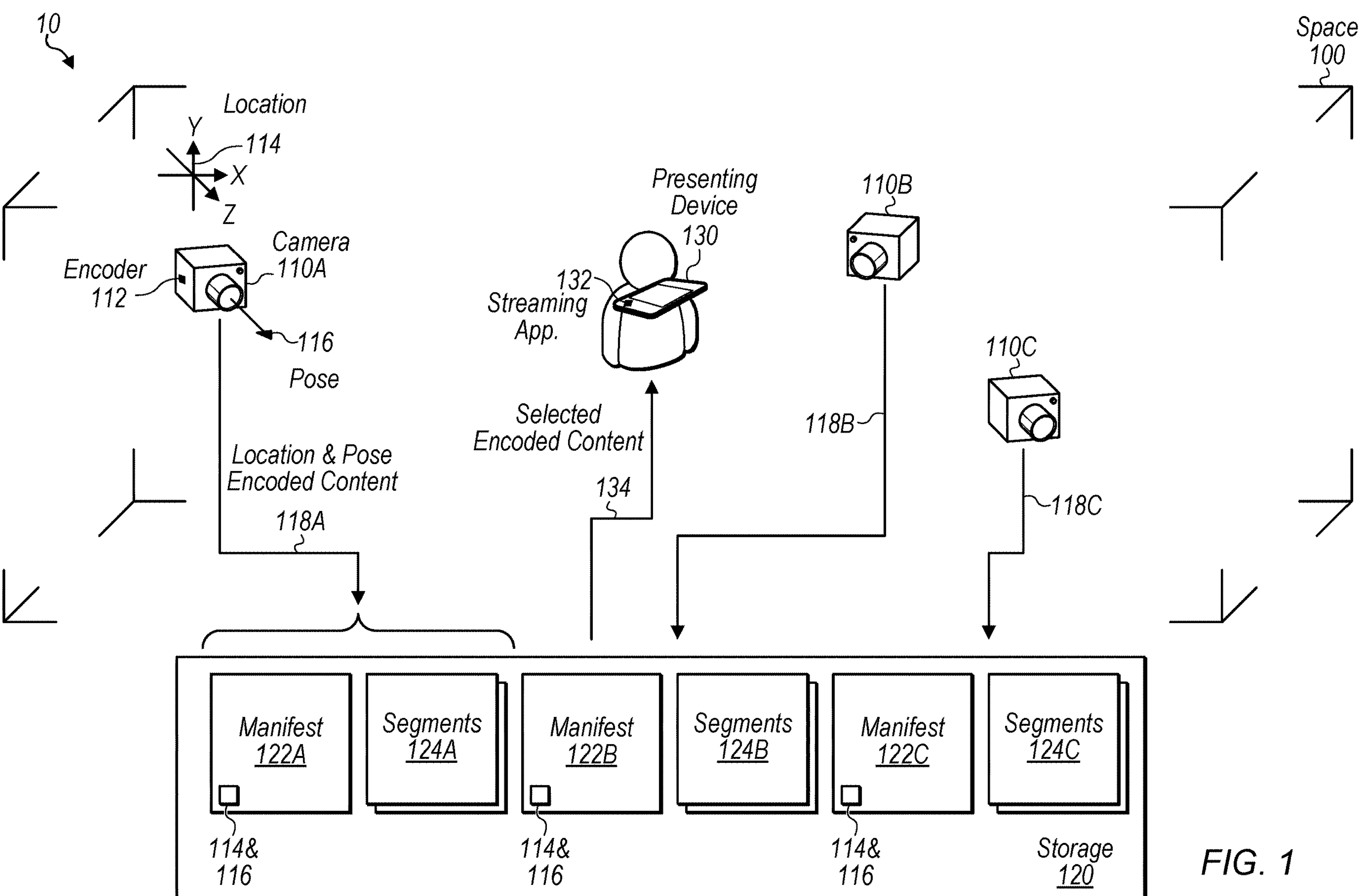
FIG. 1 is a block diagram illustrating one embodiment of a system for efficiently delivering multi-camera interactive content.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "display system configured to display three-dimensional content to a user" is intended to cover, for example, a liquid crystal display (LCD) performing this function during operation, even if the LCD in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section **112(*f*)** during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

A physical environment refers to a physical world that people can sense and/or interact with without aid of electronic systems. The physical environment may include physical features such as a physical surface or a physical object. For example, the physical environments may correspond to a physical park that includes physical trees, physical buildings, and physical people. People can directly sense and/or interact with the physical environment, such as through sight, touch, hearing, taste, and smell.

In contrast, an extended reality (XR) environment (or a computer-generated reality (CGR) environment) refers to a wholly or partially simulated environment that people sense and/or interact with via an electronic system. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect a person's head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

A person may sense and/or interact with an XR object using a gesture or any one of their senses, including sight, sound, and touch. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

A mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

DETAILED DESCRIPTION

In some instances, an extended reality (XR) environment (or other form of computer generated environment) may be generated based on a physical environment using content recorded by multiple cameras present in the physical environment. For example, in some embodiments discussed below, an XR environment may be generated using content created by multiple devices recording a concert at a concert venue. A user, who may not be attending the concert in person, may still be able to have an immersive XR experience of the concert through being able to look and move around within the XR environment to view the concert from different positions within the XR environment. Due to network and processing constraints, downloading every recording of a physical environment, however, may quickly become impractical as the number of recording devices increases and/or the quality of content increases.

The present disclosure describes embodiments of a system for more efficiently delivering multi-camera interactive content. As will be described in greater detail below, in various embodiments, a recording device capturing content within a physical environment can determine its location within the physical environment and encode its location in a manifest usable to stream the recorded content. A device presenting an XR environment based on the recorded content and content recorded by one or more additional devices can then use the encoded location to determine whether to stream the content recorded based on a location where a user of the presenting device is attempting to view content within the XR environment. Continuing with the concert venue example, if a user is attempting to view content at a location near the concert stage in an XR environment, the presenting device may attempt to download content recorded near the concert stage as such content is likely relevant to the user's current field of view. In contrast, content recorded at the back of the concert venue may not be relevant to the user's current field of view, so the presenting device may determine, based on the encoded location of this content, to not download this content. In some embodiments, the recording device may also determine its pose while recording content and encode the pose in the manifest so that the presenting device can determine an orientation of the recording device within the physical environment in order to determine whether it is relevant to a user's field of view. For example, even though a user viewing content within the XR environment may select a viewport location corresponding to a location near where content was recorded, the record content may be less relevant to the user's field of view if the viewing user has a pose in the opposite direction of the pose of the recording device such as a user looking toward the audience in a concert when the recording device had a pose directed toward the stage.

Being able to intelligently determine what recorded content is relevant based on the encoded locations and poses of recording devices within the physical environment may allow a device presenting a corresponding XR environment to greatly reduce the amount of content being streamed as irrelevant content can be disregarded—thus saving valuable network bandwidth. Still further, encoding location and pose information in a manifest provides an efficient way for a presenting device to quickly discern what content is relevant—thus saving valuable processing and power resources.

Turning now to FIG. 1, a block diagram of a content delivery system 10 is depicted. In the illustrated embodiment, system 10 includes multiple cameras 110A-C, a storage 120, and a presenting device 130. As shown, cameras 110 may include encoders 112. Storage 120 may include manifests 122A-C and segments 124A-C. Presenting device 130 may include a streaming application 132. In some embodiments, system 10 may be implemented differently than shown. For example, more (or less) recording devices 110 and presenting devices 130 may be used, encoder 112 could be located at storage 120, a single (or fewer) manifests 122 may be used, different groupings of segments 124 may be used, etc.

Cameras 110 may correspond to (or be included within) any suitable device configured to record content of a physical environment. In some embodiments, cameras 110 may correspond to point-and-shoot cameras, single-lens reflex camera (SLRs), video cameras, etc. In some embodiments, cameras 110 may correspond to (or be included within) other forms of recording devices such as a phone, tablet, laptop, desktop computer, etc. In some embodiments, cameras 110 may correspond to (or be included within) a head mounted display, such as, a headset, helmet, goggles, glasses, a phone inserted into an enclosure, etc. and may include one or more forward facing cameras 110 to capture content in front of a user's face. As yet another example, cameras 110 may be included in a vehicle dash recording system. Although various examples will be described herein in which recorded content includes video or audio content, content recorded by camera 110 may also include sensor data collected from one or more sensors in camera 110 such as world sensors 604 and/or user sensors 606 discussed below with respect to FIG. 6.

As also shown in FIG. 1 and discussed in greater detail below, cameras 110 may record content of a physical environment from different locations within a space 100. For example, in some embodiments, the physical environment may be sports venue (e.g., a stadium) where cameras 110 are placed at different locations to capture a sporting event from different angles and stream content in real time. As another example, in some embodiments, the physical environment may be a movie set where multiple cameras 110 are affixed to a mobile rig to capture a scene from different perspectives. While the locations of cameras 110, in some instances, may be static, the locations of cameras 110, in other instances, may be dynamic—and cameras 110 may begin recording content at different times relative to one another. Continuing with the concert example discussed above, cameras 110 may be held by various attendees of the concert that move around within the venue while recording content. As attendees enter or leave the venue, attendees may begin recording content at different times and for different lengths of time over the course of the concert. As yet another example, two people may be inviting a friend to share a co-presence experience with them and may be wearing head mounted displays including (or corresponding to) cameras 110. Other examples of potential physical environments may include parks, museums, shopping venues, etc. To facilitate the distribution of content recorded in a physical environment to a device presenting a corresponding XR environment, cameras 110 may each use a respective encoder 112.

Encoder 112, in various embodiments, is operable to encode recorded content in manner that facilities streaming of the content to another device such as presenting device 130 discussed below. As will be discussed in greater detail below with FIG. 3, encoder 112 may include one or more video and/or audio codecs usable to produce encoded content 118 in a variety of formats and levels of quality. To facilitate generating a corresponding XR environment, an encoder 112 (or more generally camera 110) may also determine one or more locations 114 and poses 116 of a camera 110 and encode this information in content 118 in order to facilitate a streaming device's selection of that content. Location 114, in the various embodiment, is a position of a camera 110 within a physical environment while the camera 110 records content. For example, in the illustrated embodiment, location 114 may be specified using Cartesian coordinates X, Y, and Z as defined within space 100; however, location 114 may be specified in encoded content 118 using any suitable coordinate system. In order to determine one camera 110's location 114 relative to the location 114 of another camera 110, locations 114 may be expressed relative to a common reference space 100 (or relative to a common point of reference) used by cameras 110—as well as presenting device 130 as will be discussed below. Continuing with the concert example, space 100, in some embodiments, may be defined in terms of the physical walls of the concert venue, and location 114 may be expressed in terms of distances relative to those walls. Pose 116, in various embodiments, is a pose/orientation of a camera 110 within a physical environment while the camera 110 records content. For example, in some embodiments, a pose 116 may be specified using a polar angle $\theta$, azimuthal angle $\varphi$, and rotational angle r; however, in other embodiments, a pose 116 may be expressed differently. As a given camera 110 may change its location 114 or pose 116 over time, a camera 110 may encode multiple locations 114 and/or poses 116—as well as multiple reference times to indicate where the camera 110 was located and its current pose at a given point of time. These reference times may also be based on a common time reference shared among cameras 110 in order to enable determining a recording time of one encoded content 118 vis-à-vis a recording time of another as cameras 110 may not start recording content at the same time. As shown in FIG. 1, these locations 114 and poses 116 may be specified within manifests 122, which may be provided by cameras 110 along with segments 124 to storage 120.

Storage 120, in various embodiments, is configured to store encoded content 118A-C received from cameras 110A-110C and facilitate streaming the encoded content 118. In some embodiments, storage 120 may be a single computing device, a network attached storage, etc. In other embodiments, storage 120 may be provided by a computer cluster implementing a cloud-based storage. As noted above, storage 120 may store encoded content 118 in the form of a manifest 122 and corresponding segments 124. In various embodiments, manifests 122 include metadata about each segment 124 so that a recipient can select the appropriate segments 124. For example, a manifest 122 may include a uniform resource identifier (URI) indicating where the 720p segments 124 can be downloaded for a particular encoded content 118. In various embodiments, storage 120 may support the streaming of encoded content 118 via the HyperText Transfer Protocol (HTTP) and using a streaming protocol such as HTTP Live Streaming (HLS), Moving Picture Experts Group Dynamic Adaptive Streaming over HTTP (MPEG-DASH), etc. In an embodiment in which HLS is used, manifests 122 may be implemented using one or more .m3u8 files. In an embodiment in which MPEG-DASH is used, manifests 122 may be implemented as Media Presentation Descriptions (MPDs). In other embodiments, other transmission protocols may be used, which may (or may not) leverage HTTP—and, generation of the XR environment may occur well after content 134 has been downloaded from storage 120 in some embodiments. Encoded segments 124 are small portions of recorded content 118 that are encoded in multiple formats. For example, recorded content 118 may be broken up into ten-second portions. Each portion is then encoded in multiple formats such as a first group of segments 124 encoded in 480p, a second group of segments 124 encoded in 720p., and so forth. Although, in the illustrated embodiment, each camera 110A-C is shown as creating a respective manifest 122A-C, cameras 110, in other embodiments, may record metadata including locations 114 and poses 116 to a shared manifest 122.

Presenting device 130, in various embodiments, is configured to present, to the user, an environment corresponding to the physical environment based encoded content 118 created by cameras 110. In some embodiments, presenting device 130 is a head mounted display, such as, a headset, helmet, goggles, glasses, a phone inserted into an enclosure, etc.; however, in other embodiments, presenting device 130 may correspond to other suitable devices such as a phone, camera, tablet, laptop, or desktop computer. In some embodiments, this corresponding environment is an XR environment. In other embodiments, other forms of environments may be presented. To facilitate presentation of this corresponding environment, in the illustrated embodiment, presenting device 130 executes a streaming application 132 that may receive a request from a user to stream a particular type of content 118 (e.g., a soccer game) and selectively download encoded content 134 from storage 120. As will be described next with FIG. 2, streaming application 132 may download manifests 122A-C in order to identify locations 114 and/or poses 116 of cameras 110 while recording segments 124 of the physical environment. Streaming application 132 may then determine what segments 124 to download from storage 120 based on a location where a user views content within the XR environment and based on a pose of the presenting device 130 (or of the user) while presenting the XR environment. In various embodiments, selected segments 124 includes segments 124 determined to include content 118 within a user's field of view as well as segments 124 determined to include content 118 that may be partially within a user's field of view in order to be patched into contiguous scene within the user's field of view. As a user may alter his or her location or pose while interacting with the XR environment, streaming application 132 may alter what segments 124 are downloaded based on the user's changing field of view. In some embodiments, segments 124 may also be downloaded if they are identified as having content 118 located near a user's field of view in anticipation that they may become relevant if a user's location or pose changes. Streaming application 132 may also consider other factors in request different encoded content 134 such as presenting devices 130's networking and compute resources, which may change over time.

Figure 2:
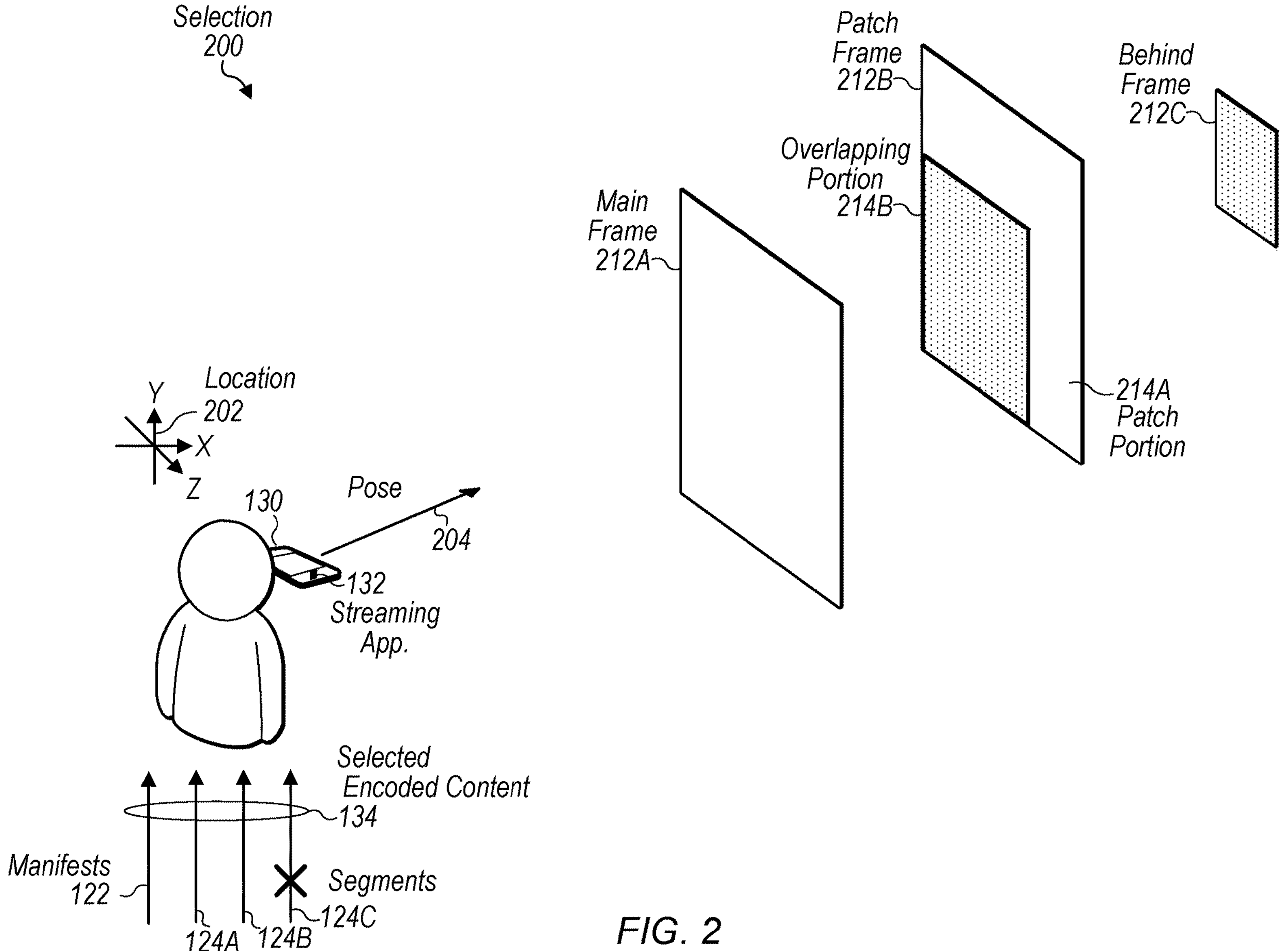
FIG. 2 is a block diagram illustrating one embodiment of a presenting device selecting multi-camera content for delivery using the system.

Turning now to FIG. 2, a block diagram of a selection 200 of encoded content 134 is depicted. In the illustrated example, streaming application 132 is performing a selection 200 from three groups of encoded content 118 created by cameras 110. In particular, segments 124A produced by camera 110A may depict content in a first frame 212A, segments 124B produced by camera 110B may depict content in a second frame 212B, and segments 124C produced by camera 110C may depict content in a third frame 212C. As shown, this selection 200 may begin with streaming application 132 downloading manifests 122 and determining a location 202 and a pose 204.

Location 202, in various embodiments, is a location where a user of presenting device views content within the XR environment. As will be described below with respect to FIG. 4, location 202 may initially correspond to some default location within the XR environment. A user may then alter this location 202 using one or more user input devices (e.g., a joystick) to move around within the XR environment. For example, a user may start at an initial location in a sports venue but then decide to move over to a portion of field where interesting action is occurring. In the illustrated embodiment, locations 202 may be specified using Cartesian coordinates X, Y, and Z as defined within space 100; however, in other embodiments, location 202 may be specified using other suitable coordinate systems.

Pose 204, in various embodiments, is a pose of the user (and presenting device 130 in some embodiments) while a user views content within the XR environment. In the illustrated embodiment in which presenting device 130 is an HMD, pose 204 may corresponds to an orientation of the user's head. A user may then alter his or her pose 204 by looking to the left or right, for example. As will be described with FIG. 4, a user may also alter pose 204 using one or more input devices of presenting device 130. In some embodiments, poses 204 may be specified using a polar angle θ, azimuthal angle φ, and rotational angle r; however, in other embodiments, poses 204 may be expressed differently.

Based on location 202 and pose 204, streaming application 132 may read manifests 122 to identify the locations 114 and poses 116 of segments 124 in order to determine which segments 124 are relevant to a user's current field of view. In the depicted example, streaming application 132 may determine that frames 212A-C are all relevant to the user's current field of view. Based on the depicted location 202 and pose 204, however, streaming application 132 may determine that frame 212C is located behind by frame 212A or frame 212B and thus determine to download segments 124A and 124B but not segments 124C. Continuing with the concert example discussed above, frames 212A-C may be captured by cameras 110 held by three separate concertgoers looking toward a stage where the camera producing frame 212A is held by the concertgoer furthest from the stage and the camera producing frame 212C is held by the concertgoer closest to the stage. As location 202 in the example depicted in FIG. 2 closest to frame 212A and (even further from the stage), streaming application 132 may initially download segments 124A including frame 212A and forgo downloading segments 124C including frame 212C. As a user's current location 202 and/or pose 204 changes, streaming application 132 may determine to discontinue streaming the content recorded by one camera 110 and determine to stream the content recorded by another camera 110. For example, if the user moved forward along the path of pose 204 toward the concert stage, at some point, frames 212A and 212B would be located behind the user's current field of view, but frame 212C might still be directly in front of the view. Thus, streaming application 132 may begin downloading segments 124C corresponding to frame 212C but discontinue downloading segments 124A and 124B corresponding to frames 212A and 212B respectively. Similarly, streaming application 132 may discontinue downloading segments 124A-C if a user remained at the same location 202 but altered pose 204 such that frame 212A-C are no longer in the user's current field of view.

In some embodiments, streaming application 132 may further patch together content of multiple frames 212 in order to present a continuous view to the user. As shown, streaming application 132 may determine, from manifests 122, that frame 212B may be partially overlapped by frame 212A based on the user's current field of view. In the event that frame 212A does not fully occupy the user's current field of view, streaming application 132 may decide to still use frame 212A as a main frame and then use frame 212B (assuming it is able to supply some of the missing content) as a patch frame such that patch portion 214A is combined with main frame 212A to produce a continuous view. The overlapping portion 214B of frame 212B, however, may be discarded. In instances in which frames 212A and 212B are not being streamed in real-time, streaming application 132 may read the references times included in manifests 122 in order to that frames 212A and 212B were created during an overlapping time frame and thus can be patched together. If patch frame 212B were created at some time after main frame 212A, it may not be possible to patch frames 212 together in order to create a contiguous view.

Some of the recording-device components used within camera 110 to facilitate encoding content 118 will now be discussed.

Figure 3:
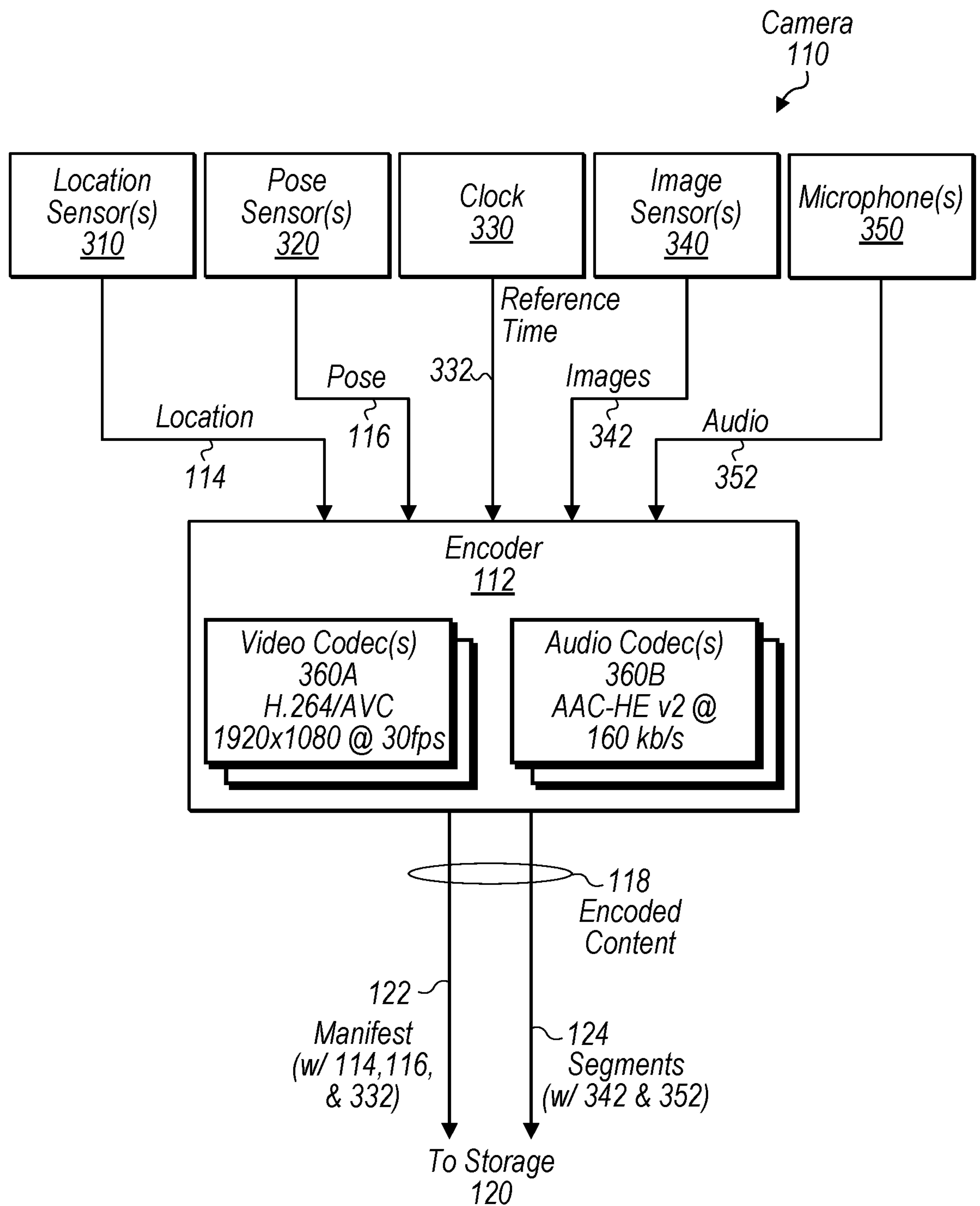
FIG. 3 is a block diagram illustrating one embodiment of components used by a camera of the system.

Turning now to FIG. 3, a block diagram of components in camera 110 is depicted. In the illustrated embodiment, camera 110 includes one or more location sensors 310, one or more pose sensors 320, clock 330, one or more image sensors 340, one or more microphones 350, and encoder 112. In other embodiments, camera 110 may be implemented differently than shown. For example, camera 110 may include other sensors that produce information used to encode content 118.

Location sensors 310, in various embodiments, are sensors configured to determine a location 114 of camera 110 while it records content 118. In some embodiments, sensors 310 include light-based location sensors that capture depth (or range) information by emitting a light and detecting its reflection on various for objects and surfaces in the physical environment. Such a sensor may, for example, employ infrared (IR) sensors with an IR illumination source, Light Detection and Ranging (LIDAR) emitters and receivers, etc. This range information may, for example, be used in conjunction with frames captured by cameras to detect and recognize objects and surfaces in the physical environment in order to determine a location 114 of camera 110 relative to locations and distances of objects and surfaces in the physical environment. In some embodiments, location sensors 310 include wireless sensors that determine a location 114 based on the signal strength of a signal emitted by a location beacon acting as a known point of reference within the physical environment such as a location beacon using Bluetooth® low energy (LE). In some embodiments, location sensors 310 include geolocation sensors such as ones supporting Global Positioning System (GPS), global navigation satellite system (GNSS), etc. In other embodiments, other forms of location sensors may be employed.

Pose sensors 320, in various embodiments, are sensors configured to determine a pose 116 of camera 110 while it records content 118. Accordingly, pose sensors 320 include one or more inertial measurement unit (IMU) sensors, accelerometer sensors, gyroscope sensors, magnetometer sensors, etc. configured to determine a pose of camera 110 while recording the content 118. In some embodiments, pose sensors 320 may employ one or more visual inertial odometry algorithms using camera and IMU-sensor inputs. In some embodiments in which camera 110 is also an HMD, pose sensors 320 may include may capture information about the position and/or motion of the user and/or the user's head while recording content 118. In some embodiments, pose sensors 320 include wireless sensors that determine a pose 116 using a directional antenna used to assess the signal strength of a signal emitted by a location beacon.

Clock 330, in various embodiments, is configured to maintain a current time that can be used as a reference time to determine when content 118 is recorded by camera 110. As mentioned above, this reference time may be encoded in manifest 122 and may be usable by streaming application 132 to determine whether particular segments 124 relative to a time at which a user is viewing content 134. Streaming application 132 may also use this reference time along with the reference times associated with the content 118 recorded by the one or more other cameras 110 to patch together the content recorded by the cameras 110 to present the XR environment. In order to maintain the accuracy of clock 330, camera 110 may periodically synchronize clock 330 with a trusted authority, for example, using the network time protocol.

Image sensors 340, in various embodiments, are configured to record images 342 for inclusion in segments 124. Accordingly, images sensors 340 may include one or more metal-oxide-semiconductor (CMOS) sensors, N-type metal-oxide-semiconductor (N-MOS) sensors, or other suitable sensors. In some embodiments in which camera 110 is an HMD, image sensors 340 may include left and right sensors 340 located on a front surface of the HMD at positions that are substantially in front of each of the user's eyes.

Microphones 350, in various embodiments, are configured to record audio 352 for inclusion in segments 124. In some embodiments, microphones 350 include a left-side microphone 350 and a right-side microphone 350 in order to produce stereo audio 352. In some embodiments, microphones 350 may include a microphone array of several microphones different positions in order to generate spatial audio. Microphones 350 may correspond to any suitable type and may be omni-directional, unidirectional, etc.

In the illustrated embodiment, encoder 112 receives location 114, pose 116, reference time 332, images 342, and audio 352 in order to perform the encoding of recorded content 118 for camera 110. Encoder 112 may thus include various video codecs 360A and audio codecs 360B operable to produce a manifest 122 and segments 124. For example, as shown, encoder 112 may include a video codec 360A supporting H.264/AVC encoding at 1080p (1920×1080 resolution) and at 30 fps. Encoder 112 may also include an audio codec 360B supporting AAC-HE v2 encoding at 160 kb/s. Video and audio codecs 360 may, however, support any suitable formats. In some embodiments, codecs 360 may encode content other than video and audio content such as sensor data as noted above and discussed below. In some embodiments, codecs 360 may be implemented in software that is executed by camera 110 to generate manifests 122 and segments 124. In some embodiments, codecs 360 may be implemented in dedicated hardware configured to generate segments manifests 122 and segments 124. For example, camera 110 may include image signal processor, a system on a chip (SoC) having an image sensor pipeline, etc. with dedicated codec 360 circuitry.

Figure 4:
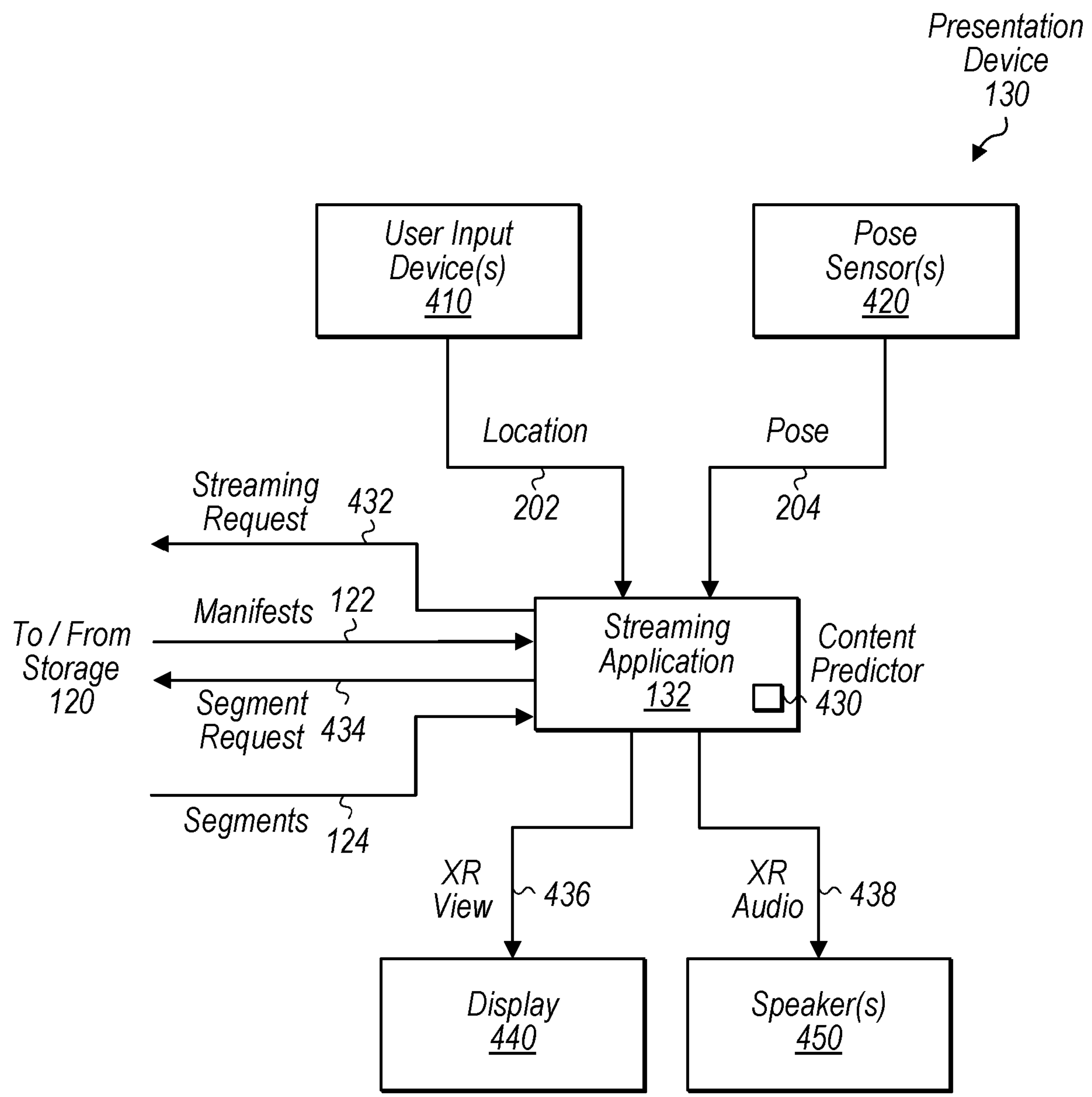
FIG. 4 is a block diagram illustrating one embodiment of components used by a presenting device of the system.

Turning now to FIG. 4, a block diagram of components in presenting device 130 is depicted. In the illustrated embodiment, presenting device 130 includes one or more user inputs devices 410, pose sensors 420, streaming application 132 including content predictor 430, a display 440, speakers 450. In some embodiments, presenting device 130 may be implemented differently than shown such as including one or more components discussed below with respect to FIG. 6.

User input devices 410, in various embodiments, are configured to collect information from a user in order to determine a user's location 202 within an XR environment. For example, when streaming begins, a user's viewing location 202 may initially be set to some default location 202. A user may then want to alter this location 202 and provide corresponding inputs to user input devices 410 to cause the location 202 to be altered. For example, in an embodiment in which user input devices 410 include a joystick, a user may push forward on the joystick to move the viewing location 202 forward in the direction of the user's pose. User input devices 410, however, may include any of various devices. In some embodiments, user input devices 410 may include a keyboard, mouse, touch screen display, motion sensor, steering wheel, camera, etc. In some embodiments, user input devices 410 include one or more user sensors that may include one or more hand sensors (e.g., IR cameras with IR illumination) that track position, movement, and gestures of the user's hands, fingers, arms, legs, and/or head. For example, in some embodiments, detected position, movement, and gestures of the user's hands, fingers, and/or arms may be used to alter a user's location 202. As another example, in some embodiments, the changing of a user's head position as determined by one or more sensors, such as caused by a user leaning forward (or backward) and/or walking around within a room, may be used to alter a user's location 202 within an XR environment.

Pose sensors 420, in various embodiments, are configured to collect information from a user in order to determine a user's pose 204 within an XR environment. In some embodiments, pose sensors 420 may be implemented in a similar manner as pose sensors 320 discussed above. Accordingly, pose sensors 420 may include head pose sensors and eye tracking sensors that determine a user's pose 204 based on a current head position and eye positions. In some embodiments pose sensors 420 may correspond to user input devices 410 discussed above. For example, a user may adjust his or her pose 204 by pushing forward or backward on a joystick to move the pose 204 up or down.

As discussed above, streaming application 132 may consider a user's location 202 and pose 204 to select encoded content 134 for presentation on presenting device 130. In the illustrated embodiment, streaming application 132 may initiate its exchange with storage 120 to obtain selected content 134 by sending, to storage 120, a request 432 to stream content recorded by cameras 110 of a physical environment. In response to the request 432, streaming application 132 may receive one or more manifests 122 usable to stream content 134 recorded by cameras 110. Based on the locations 114 and poses 116 of cameras 110 identified in the manifests, streaming application 132 may send, to storage 120, requests 434 to provide segments 124 of the recorded content 118 selected based a location 202 where a user of views content within the XR environment as identified by user input devices 410 and a pose 204 as identified by pose sensors 420. In some embodiments discussed below, streaming application 132 may further send requests 434 for segments 124 based on a prediction by predictor 430 that the segments 124 may be needed based on future locations 202 and poses 204. Streaming application 132 may then receive, from storage 120, the requested segments 124 and process these segments 124 to produce a corresponding XR view 436 presented via display 440 and corresponding XR audio 438 presented via speakers 450.

Predictor 430, in various embodiments, is executable to predict what content 118 may be consumed in the future so that streaming application 132 can begin downloading the content in advance of it be consumed. Accordingly, predictor 430 may predict a future location 202 and/or pose 204 where the user is likely to view content within the XR environment and, based on the predicted location 202 and/or 204, determining to what content 118 should likely be streamed by streaming application 132. In various embodiments, predictor 430 tracks previous history of locations 202 and pose 204 information and attempt to infer future locations and poses 204 using a machine learning algorithm such as linear regression. In some embodiments, predictor 430's inference may be based on properties of the underlying content being streamed. For example, if a user is viewing content and it is known that an item is going to appear in the content that is likely to draw the user's attention (e.g., an explosion depicted on the user's peripheral), predictor 430 may assume that the user is likely to alter his or her location 202 and/or pose 204 to view the item. In other embodiments, other techniques may be employed to predict future content 118 to select from storage 120.

Figure 5A:
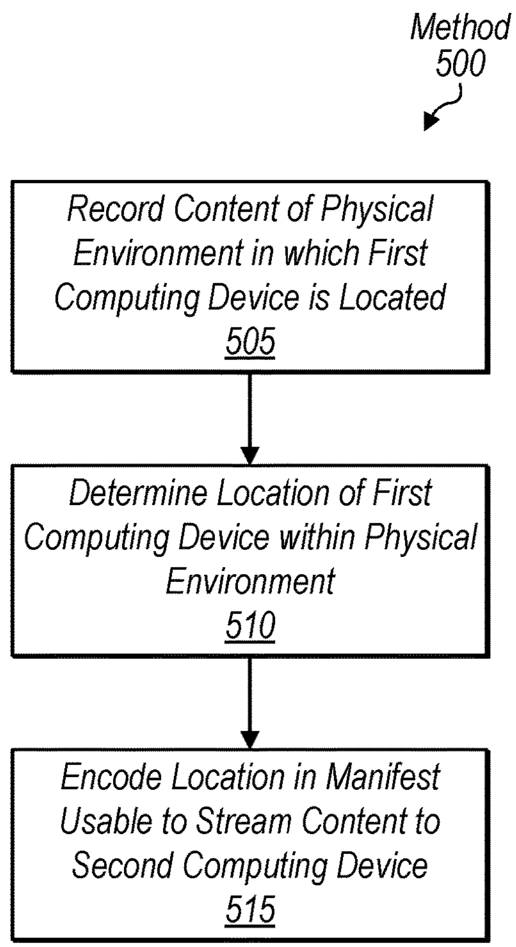
FIGS. 5A-5C are flow diagrams illustrating embodiments of methods for efficiently delivering multi-camera interactive content.

Turning now to FIG. 5A, a flow diagram of a method 500 is depicted. Method 500 is one embodiment of a method that may be performed by a first computing device recording content, such as camera 110 using encoder 112. In many instances, performance of method 500 may allow recorded content to be delivered more efficiently.

In step 505, the first computing device records content of a physical environment in which the first computing device is located. In various embodiments, the content is deliverable to a second computing device (e.g., presenting device 130) configured to present a corresponding environment based on the recorded content and content recorded by one or more additional computing devices (e.g., other cameras 110). In some embodiments, the first computing device is a head mounted display (HMD) configured to record the content using one or more forward facing cameras included in the HMD. In some embodiments, the corresponding environment is an extended reality (XR) environment.

In step 510, the first computing device determines a location (e.g., location 114) of the first computing device within the physical environment. In some embodiments, the first computing device also determines a pose (e.g., pose 116) of the first computing device while recording the content and/or determines a reference time (e.g., reference time 332) for when the content is recorded by the first computing device.

In step 515, the first computing device encodes the location in a manifest (e.g., a manifest 122) usable to stream the content recorded by the first computing device to the second computing device. In various embodiments, the encoded location is usable by the second computing device to determine whether to stream the content recorded by the first computing device. In some embodiments, the location is encoded in a manner that allows the second computing device to determine a location where the content is recorded by the first computing device relative to a location (e.g., location 202) where a user of the second computing device views content within the corresponding environment. In some embodiments, the first computing device also encodes the pose in the manifest, the encoded pose being usable by the second computing device to determine whether to stream the content recorded by the first computing device based on a pose (e.g., pose 204) of the second computing device while presenting the corresponding environment. In some embodiments, the first computing device also encodes the reference time in the manifest, the reference time being usable by the second computing device with reference times associated with the content recorded by the one or more additional computing devices to patch together the content recorded by the first computing device and the content recorded by the one or more additional computing devices to present the corresponding environment.

In some embodiments, method 500 further includes providing, to a storage (e.g., storage 120) accessible to the second computing device for streaming the recorded content, segments (e.g., segments 124) of the recorded content and the manifest. In some embodiments, the manifest is a media presentation description (MPD) usable to stream the recorded content to the second computing device via Moving Picture Experts Group Dynamic Adaptive Streaming over HTTP (MPEG-DASH). In some embodiments, the manifest is one or more .m3u8 files usable to stream the recorded content to the second computing device via HTTP Live Streaming (HLS).

Figure 5B:
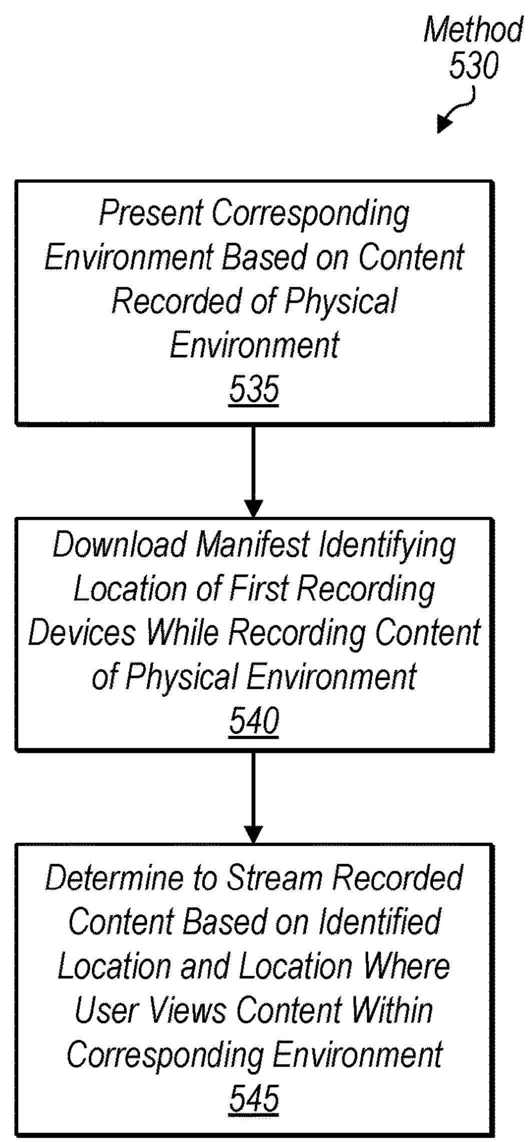

Turning now to FIG. 5B, a flow diagram of a method 530 is depicted. Method 530 is one embodiment of a method that may be performed by a computing device presenting encoded content, such as presenting device 130 using streaming application 132. In many instances, performance of method 530 may allow a user accessing presented content to have a better user experience.

In step 535, the computing device presents a corresponding environment based on content (e.g., content 118) recorded of a physical environment by a plurality of recording devices within the physical environment. In some embodiments, the corresponding environment is an extended reality (XR) environment.

In step 540, as part of presenting the corresponding environment, the computing device downloads a manifest (e.g., manifest 122) identifying a location (e.g., location 114) of a first of the plurality of recording devices while recording content of the physical environment. In various embodiments, the computing device also reads pose information included in the downloaded manifest, the pose information identifying a pose (e.g., pose 116) of the first recording device while recording content of the physical environment. In various embodiments, the computing device also reads a reference time (e.g. reference time 332) included in the downloaded manifest, the reference time identifying when the content is recorded by the first recording device.

In step 545, the computing device determines to stream the content recorded by the first recording device based on the identified location and a location (e.g., location 202) where a user views content within the corresponding environment. In various embodiments, the computing device also determines to stream the content recorded by the first recording device based on the identified pose and a pose (e.g., pose 204) of the computing device while a user views content within the corresponding environment. In one embodiment, the computing device is a head mounted display (HMD), and the pose of the computing device corresponds to an orientation of the user's head. In some embodiments, the computing device creates a view (e.g., XR view 436) of the corresponding environment by patching together the content recorded by the first recording device and content recorded by one or more others of the plurality of recording devices based on the reference time and reference times associated with the content recorded by the one or more other recording devices.

In some embodiments, method 530 further includes receiving an input (e.g., via a user input device 410) from the user altering the location where the user views content within the XR environment. In such an embodiment, in response to the altered location, the computing device determines to discontinue streaming the content recorded by the first recording device and determines to stream the content recorded by a second of the plurality of recording devices based on an identified location of the second recording device. In some embodiments, the computing device predicts (e.g., using content predictor 430) a future location where the user is likely to view content within the corresponding environment and, based on the predicted location, determines to stream content recorded by one or more of the plurality of recording devices. In various embodiments, the computing device streams the recorded content from a storage (e.g., storage 120) accessible to the plurality of recording devices for storing manifests and corresponding segments (e.g. segments 124) of recorded content of the physical environment. In some embodiments, the manifests are media presentation descriptions (MPDs) or .m3u8 files.

Figure 5C:
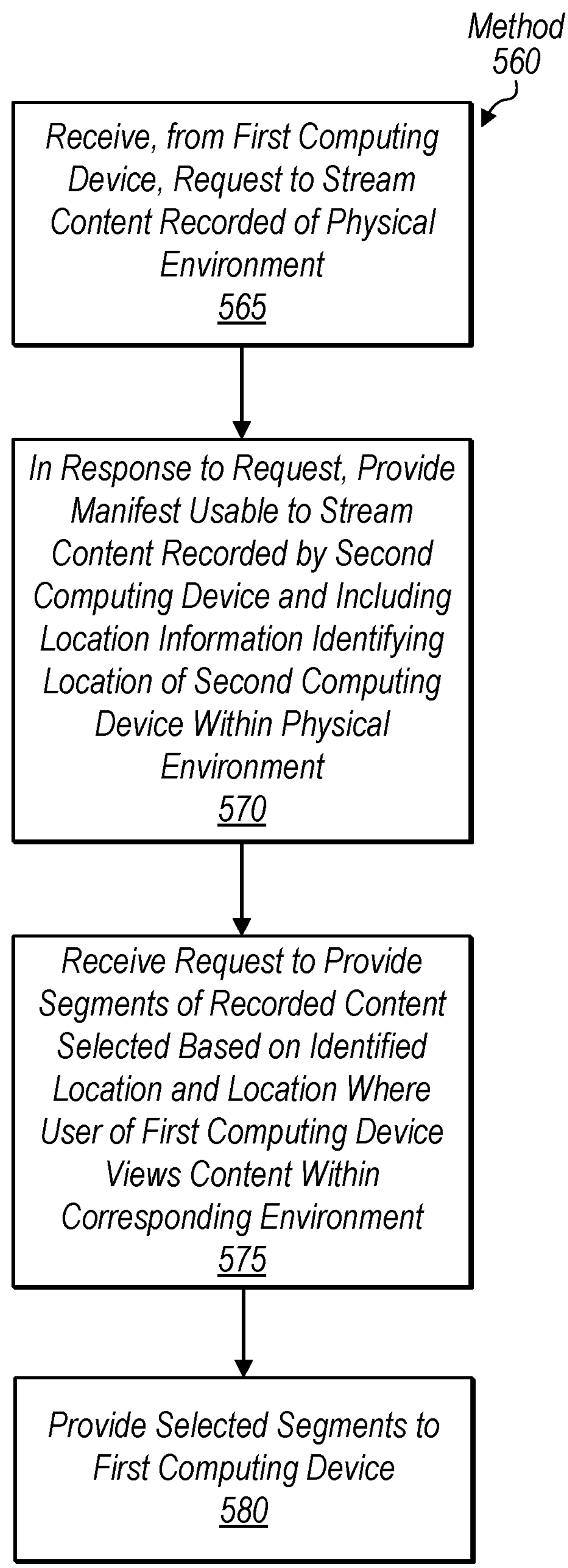

Turning now to FIG. 5C, a flow diagram of a method 560 is depicted. Method 560 is one embodiment of a method that may be performed by a computing system facilitating the streaming of encoded content, such as storage 120. In many instances, performance of method 560 may allow a user accessing presented content to have a better user experience.

In step 565, a computing system receives, from a first computing device (e.g., presenting device 130), a request (e.g., streaming request 432) to stream content (e.g., encoded content 118) recorded by a plurality of computing devices (e.g., cameras 110) of a physical environment. In various embodiments, the first computing device is configured to present a corresponding environment based on the streamed content. In some embodiments, the first and second computing devices are head mounted displays. In some embodiments, the corresponding environment is an extended reality (XR) environment.

In step 570, the computing system provides, in response to the request, a manifest (e.g., a manifest 122) usable to stream content recorded by a second of the plurality of computing devices, the manifest including location information identifying a location (e.g., location 114) of the second computing device within the physical environment (e.g., corresponding to space 100).

In step 575, the computing system receives a request (e.g., segment request 434) to provide segments (e.g., segments 124) of the recorded content selected based on the identified location and a location (e.g., location 202) where a user of the first computing device views content within the corresponding environment. In some embodiments, the manifest includes pose information determined using visual inertial odometry (e.g., as employed by pose sensors 320) by the second computing device and identifying a pose (e.g., pose 116) of the second computing device while recording the content, and the pose information is usable by the first computing device to select the segments based on the pose of the second computing device and a pose (e.g., pose 204) of the first computing device while presenting the corresponding environment. In some embodiments, the manifest includes a reference time (e.g., reference time 332) for when the content is recorded by the second computing device, and the reference time is usable by the first computing device with reference times associated with the content recorded by one or more others of the plurality of computing devices to patch together a view (e.g., XR view 435) of the corresponding environment from the content recorded by the second computing device and the content recorded by the one or more other computing devices.

In step 580, the computing system provides the selected segments to the first computing device.

Figure 6:
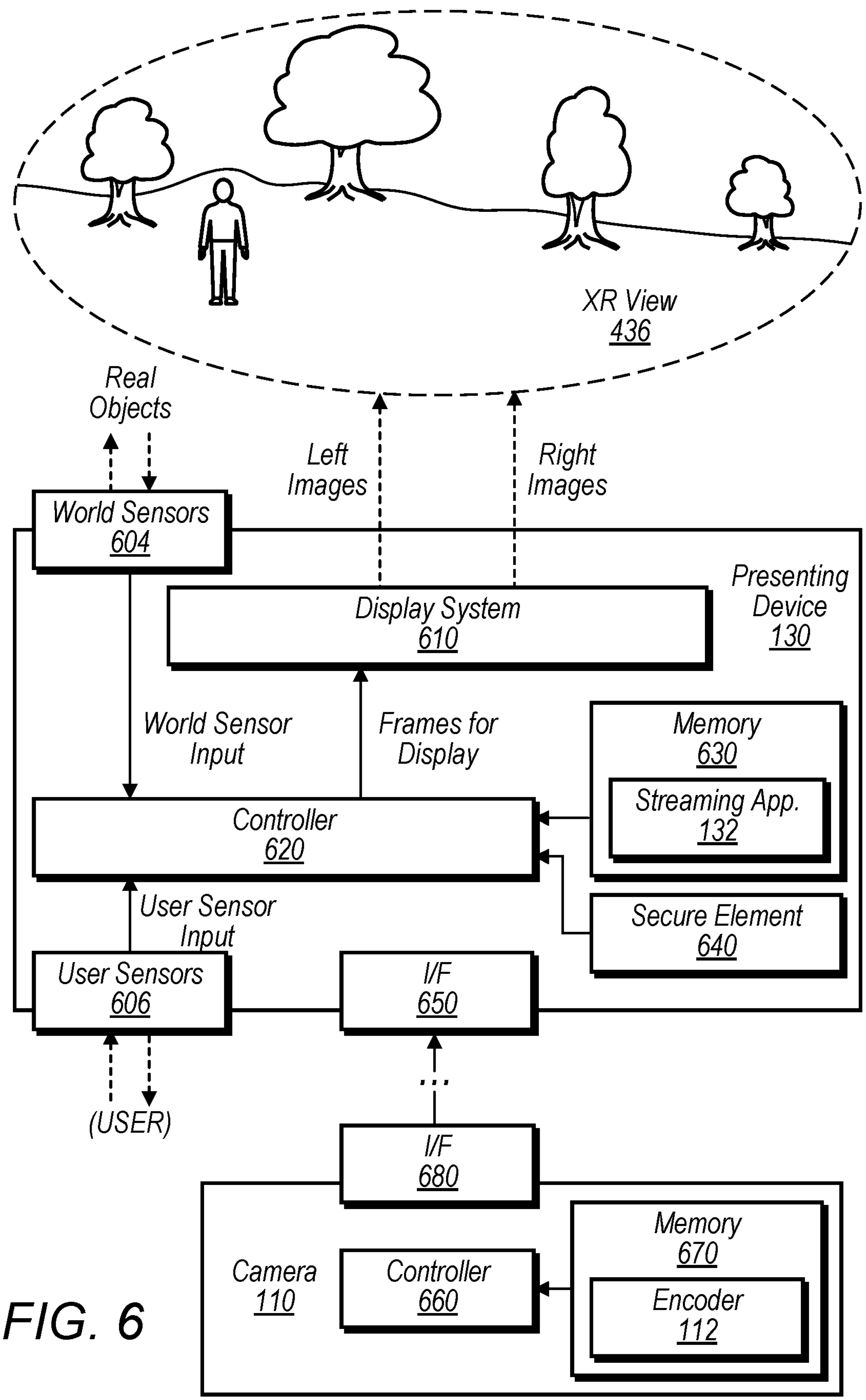
FIG. 6 is a block diagram illustrating one embodiment of additional exemplary components included in the presenting device, the recording device, and/or a storage of system.

Turning now to FIG. 6, a block diagram of components within presenting device 130 and a camera 110 is depicted. In some embodiments, presenting device 130 is a head-mounted display (HMD) configured to be worn on the head and to display content, such as an XR view 436, to a user. For example, device 130 may be a headset, helmet, goggles, glasses, a phone inserted into an enclosure, etc. worn by a user. As noted above, however, presenting device 130 may correspond to other devices in other embodiments, which may include one or more of components 604-650. In the illustrated embodiment, device 130 includes world sensors 604, user sensors 606, a display system 610, controller 620, memory 630, secure element 640, and a network interface 650. As shown, camera 110 (or storage 120 in some embodiments) includes a controller 660, memory 670, and network interface 680. In some embodiments, device 130 and cameras 110 may be implemented differently than shown. For example, device 130 and/or camera 110 may include multiple network interfaces 650, device 130 may not include a secure element 640, cameras 110 may include a secure element 640, etc.

World sensors 604, in various embodiments, are sensors configured to collect various information about the environment in which a user wears device 130 and may be used to create recorded content 118. In some embodiments, world sensors 604 may include one or more visible-light cameras that capture video information of the user's environment. This information also may, for example, be used to provide an XR view 436 of the real environment, detect objects and surfaces in the environment, provide depth information for objects and surfaces in the real environment, provide position (e.g., location and orientation) and motion (e.g., direction and velocity) information for the user in the real environment, etc. In some embodiments, device 130 may include left and right cameras located on a front surface of the device 130 at positions that are substantially in front of each of the user's eyes. In other embodiments, more or fewer cameras may be used in device 130 and may be positioned at other locations. In some embodiments, world sensors 604 may include one or more world mapping sensors (e.g., infrared (IR) sensors with an IR illumination source, or Light Detection and Ranging (LIDAR) emitters and receivers/detectors) that, for example, capture depth or range information for objects and surfaces in the user's environment. This range information may, for example, be used in conjunction with frames captured by cameras to detect and recognize objects and surfaces in the real-world environment, and to determine locations, distances, and velocities of the objects and surfaces with respect to the user's current position and motion. The range information may also be used in positioning virtual representations of real-world objects to be composited into an XR environment at correct depths. In some embodiments, the range information may be used in detecting the possibility of collisions with real-world objects and surfaces to redirect a user's walking. In some embodiments, world sensors 604 may include one or more light sensors (e.g., on the front and top of device 130) that capture lighting information (e.g., direction, color, and intensity) in the user's physical environment. This information, for example, may be used to alter the brightness and/or the color of the display system in device 130.

User sensors 606, in various embodiments, are sensors configured to collect various information about a user wearing device 130 and may be used to produce encoded content 118. In some embodiments, user sensors 606 may include one or more head pose sensors (e.g., IR or RGB cameras) that may capture information about the position and/or motion of the user and/or the user's head. The information collected by head pose sensors may, for example, be used in determining how to render and display views 436 of the XR environment and content within the views. For example, different views 436 of the environment may be rendered based at least in part on the position of the user's head, whether the user is currently walking through the environment, and so on. As another example, the augmented position and/or motion information may be used to composite virtual content into the scene in a fixed position relative to the background view of the environment. In some embodiments there may be two head pose sensors located on a front or top surface of the device 130; however, in other embodiments, more (or fewer) head-pose sensors may be used and may be positioned at other locations. In some embodiments, user sensors 606 may include one or more eye tracking sensors (e.g., IR cameras with an IR illumination source) that may be used to track position and movement of the user's eyes. In some embodiments, the information collected by the eye tracking sensors may be used to adjust the rendering of images to be displayed, and/or to adjust the display of the images by the display system of the device 130, based on the direction and angle at which the user's eyes are looking. In some embodiments, the information collected by the eye tracking sensors may be used to match direction of the eyes of an avatar of the user to the direction of the user's eyes. In some embodiments, brightness of the displayed images may be modulated based on the user's pupil dilation as determined by the eye tracking sensors. In some embodiments, user sensors 606 may include one or more eyebrow sensors (e.g., IR cameras with IR illumination) that track expressions of the user's eyebrows/forehead. In some embodiments, user sensors 606 may include one or more lower jaw tracking sensors (e.g., IR cameras with IR illumination) that track expressions of the user's mouth/jaw. For example, in some embodiments, expressions of the brow, mouth, jaw, and eyes captured by sensors 606 may be used to simulate expressions on an avatar of the user in a co-presence experience and/or to selectively render and composite virtual content for viewing by the user based at least in part on the user's reactions to the content displayed by device 130. In some embodiments, user sensors 606 may include one or more hand sensors (e.g., IR cameras with IR illumination) that track position, movement, and gestures of the user's hands, fingers, and/or arms. For example, in some embodiments, detected position, movement, and gestures of the user's hands, fingers, and/or arms may be used to simulate movement of the hands, fingers, and/or arms of an avatar of the user in a co-presence experience. As another example, the user's detected hand and finger gestures may be used to determine interactions of the user with virtual content in a virtual space, including but not limited to gestures that manipulate virtual objects, gestures that interact with virtual user interface elements displayed in the virtual space, etc.

In some embodiments, world sensors 404 and/or user sensors 606 may be used implement one or more of elements 310-350 and/or 410-420.

Display system 610, in various embodiments, is configured to display rendered frames to a user. Display 610 may implement any of various types of display technologies. For example, as discussed above, display system 610 may include near-eye displays that present left and right images to create the effect of three-dimensional view 602. In some embodiments, near-eye displays may use digital light processing (DLP), liquid crystal display (LCD), liquid crystal on silicon (LCoS), or light-emitting diode (LED). As another example, display system 610 may include a direct retinal projector that scans frames including left and right images, pixel by pixel, directly to the user's eyes via a reflective surface (e.g., reflective eyeglass lenses). To create a three-dimensional effect in view 602, objects at different depths or distances in the two images are shifted left or right as a function of the triangulation of distance, with nearer objects shifted more than more distant objects. Display system 610 may support any medium such as an optical waveguide, a hologram medium, an optical combiner, an optical reflector, or any combination thereof. In some embodiments, display system 610 may be the transparent or translucent and be configured to become opaque selectively. In some embodiments, display system 610 may implement display 440 discussed above.

Controller 620, in various embodiments, includes circuitry configured to facilitate operation of device 130. Accordingly, controller 620 may include one or more processors configured to execute program instructions, such as streaming application 132, to cause device 130 to perform various operations described herein. These processors may be CPUs configured to implement any suitable instruction set architecture, and may be configured to execute instructions defined in that instruction set architecture. For example, in various embodiments controller 620 may include general-purpose or embedded processors implementing any of a variety of instruction set architectures (ISAs), such as ARM, x86, PowerPC, SPARC, RISC, or MIPS ISAs, or any other suitable ISA. In multiprocessor systems, each of the processors may commonly, but not necessarily, implement the same ISA. Controller 620 may employ any microarchitecture, including scalar, superscalar, pipelined, superpipelined, out of order, in order, speculative, non-speculative, etc., or combinations thereof. Controller 620 may include circuitry to implement microcoding techniques. Controller 620 may include one or more levels of caches, which may employ any size and any configuration (set associative, direct mapped, etc.). In some embodiments, controller 620 may include at least GPU, which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 620 may include one or more other components for processing and rendering video and/or images, for example image signal processors (ISPs), coder/decoders (codecs), etc. In some embodiments, controller 620 may be implemented as a system on a chip (SOC).

Memory 630, in various embodiments, is a non-transitory computer readable medium configured to store data and program instructions executed by processors in controller 620 such as streaming application 132. Memory 630 may include any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. Memory 630 may also be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Secure element (SE) 640, in various embodiments, is a secure circuit configured perform various secure operations for device 130. As used herein, the term "secure circuit" refers to a circuit that protects an isolated, internal resource from being directly accessed by an external circuit such as controller 620. This internal resource may be memory that stores sensitive data such as personal information (e.g., biometric information, credit card information, etc.), encryptions keys, random number generator seeds, etc. This internal resource may also be circuitry that performs services/operations associated with sensitive data such as encryption, decryption, generation of digital signatures, etc. For example, SE 640 may maintain one or more cryptographic keys that are used to encrypt data stored in memory 630 in order to improve the security of device 130. As another example, secure element 640 may also maintain one or more cryptographic keys to establish secure connections between cameras 110, storage 120, etc., authenticate device 130 or a user of device 130, etc. As yet another example, SE 640 may maintain biometric data of a user and be configured to perform a biometric authentication by comparing the maintained biometric data with biometric data collected by one or more of user sensors 606. As used herein, "biometric data" refers to data that uniquely identifies the user among other humans (at least to a high degree of accuracy) based on the user's physical or behavioral characteristics such as fingerprint data, voice-recognition data, facial data, iris-scanning data, etc.

Network interface 650, in various embodiments, includes one or more interfaces configured to communicate with external entities such as storage 120 and/or cameras 110. Network interface 650 may support any suitable wireless technology such as Wi-Fi®, Bluetooth®, Long-Term Evolution™, etc. or any suitable wired technology such as Ethernet, Fibre Channel, Universal Serial Bus™ (USB) etc. In some embodiments, interface 650 may implement a proprietary wireless communications technology (e.g., 60 gigahertz (GHz) wireless technology) that provides a highly directional wireless connection. In some embodiments, device 130 may select between different available network interfaces based on connectivity of the interfaces as well as the particular user experience being delivered by device 130. For example, if a particular user experience requires a high amount of bandwidth, device 130 may select a radio supporting the proprietary wireless technology when communicating wirelessly to stream higher quality content. If, however, a user is merely a lower-quality movie, Wi-Fi® may be sufficient and selected by device 130. In some embodiments, device 130 may use compression to communicate in instances, for example, in which bandwidth is limited.

Controller 660, in various embodiments, includes circuitry configured to facilitate operation of device 130. Controller 660 may implement any of the functionality described above with respect to controller 620. For example, controller 660 may include one or more processors configured to execute program instructions to cause camera 110 to perform various operations described herein such as executing encoder 112 to encode recorded content 118.

Memory 670, in various embodiments, is configured to store data and program instructions executed by processors in controller 660. Memory 670 may include any suitable volatile memory and/or non-volatile memory such as those noted above with memory 630. Memory 670 may be implemented in any suitable configuration such as those noted above with memory 630.

Network interface 680, in various embodiments, includes one or more interfaces configured to communicate with external entities such as device 130 as well as storage 120. Network interface 680 may also implement any of suitable technology such as those noted above with respect to network interface 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a first computing device to cause the first computing device to perform operations comprising:

recording content of a physical environment in which the first computing device is located, wherein the content is deliverable to a second computing device configured to present a corresponding environment based on the recorded content and content recorded by one or more additional computing devices;

determining a location of the first computing device within the physical environment; and encoding the location in a manifest usable to stream the content recorded by the first computing device to the second computing device, wherein the encoded location is usable by the second computing device to determine whether to stream the content recorded by the first computing device.

2. The computer readable medium of claim 1, wherein the location is encoded in a manner that allows the second computing device to determine a location where the content is recorded by the first computing device relative to a location where a user of the second computing device views content within the corresponding environment.

3. The computer readable medium of claim 1, wherein the operations further comprise:

determining a pose of the first computing device while recording the content; and encoding the pose in the manifest, wherein the encoded pose is usable by the second computing device to determine whether to stream the content recorded by the first computing device based on a pose of the second computing device while presenting the corresponding environment.

4. The computer readable medium of claim 1, wherein the operations further comprise:

determining a reference time for when the content is recorded by the first computing device; and encoding the reference time in the manifest, wherein the reference time is usable by the second computing device with reference times associated with the content recorded by the one or more additional computing devices to patch together the content recorded by the first computing device and the content recorded by the one or more additional computing devices to present the corresponding environment.

5. The computer readable medium of claim 1, wherein the operations further comprise:

providing, to a storage accessible to the second computing device for streaming the recorded content, segments of the recorded content and the manifest.

6. The computer readable medium of claim 1, wherein the manifest is a media presentation description (MPD) usable to stream the recorded content to the second computing device via Moving Picture Experts Group Dynamic Adaptive Streaming over HTTP (MPEG-DASH).

7. The computer readable medium of claim 1, wherein the manifest is one or more .m3u8 files usable to stream the recorded content to the second computing device via HTTP Live Streaming (HLS).

8. The computer readable medium of claim 1, wherein the first computing device is a head mounted display (HMD) configured to record the content using one or more forward facing cameras included in the HMD, and wherein the corresponding environment is an extended reality (XR) environment.

9. A non-transitory computer readable medium having program instructions stored therein that are executable by a computing device to cause the computing device to perform operations comprising:

presenting a corresponding environment based on content recorded of a physical environment by a plurality of recording devices within the physical environment, wherein presenting the corresponding environment includes:

downloading a manifest identifying a location of a first of the plurality of recording devices while recording content of the physical environment; and determining to stream the content recorded by the first recording device based on the identified location and a location where a user views content within the corresponding environment.

10. The computer readable medium of claim 9, wherein presenting the corresponding environment includes:

receiving an input from the user altering the location where the user views content within the corresponding environment;

in response to the altered location:

determining to discontinue streaming the content recorded by the first recording device; and determining to stream the content recorded by a second of the plurality of recording devices based on an identified location of the second recording device.

11. The computer readable medium of claim 10, wherein presenting the corresponding environment includes:

predicting a future location where the user is likely to view content within the corresponding environment; and based on the predicted location, determining to stream content recorded by one or more of the plurality of recording devices.

12. The computer readable medium of claim 9, wherein presenting the corresponding environment includes:

reading pose information included in the downloaded manifest, wherein the pose information identifies a pose of the first recording device while recording content of the physical environment; and determining to stream the content recorded by the first recording device based on the identified pose and a pose of the computing device while the user views content within the corresponding environment.

13. The computer readable medium of claim 12, wherein the computing device is a head mounted display (HMD), wherein the pose of the computing device corresponds to an orientation of the user's head, and wherein the corresponding environment is an extended reality (XR) environment.

14. The computer readable medium of claim 9, wherein presenting the corresponding environment includes:

reading a reference time included in the downloaded manifest, wherein the reference time identifies when the content is recorded by the first recording device; and creating a view of the corresponding environment by patching together the content recorded by the first recording device and content recorded by one or more others of the plurality of recording devices based on the reference time and reference times associated with the content recorded by the one or more other recording devices.

15. The computer readable medium of claim 9, wherein presenting the corresponding environment includes:

streaming the recorded content from a storage accessible to the plurality of recording devices for storing manifests and corresponding segments of recorded content of the physical environment.

16. The computer readable medium of claim 15, wherein the manifests are media presentation descriptions (MPDs) or .m3u8 files.

17. A method, comprising:

receiving, by a computing system from a first computing device, a request to stream content recorded by a plurality of computing devices of a physical environment, wherein the first computing device is configured to present a corresponding environment based on the streamed content;

in response to the request, providing, by the computing system, a manifest usable to stream content recorded by a second of the plurality of computing devices, wherein the manifest includes location information identifying a location of the second computing device within the physical environment;

receiving, by the computing system, a request to provide segments of the recorded content selected based on the identified location and a location where a user of the first computing device views content within the corresponding environment; and providing, by the computing system, the selected segments to the first computing device.

18. The method of claim 17, wherein the manifest includes pose information determined using visual inertial odometry by the second computing device and identifying a pose of the second computing device while recording the content; and wherein the pose information is usable by the first computing device to select the segments based on the pose of the second computing device and a pose of the first computing device while presenting the corresponding environment.

19. The method of claim 17, wherein the manifest includes a reference time for when the content is recorded by the second computing device; and wherein the reference time is usable by the first computing device with reference times associated with the content recorded by one or more others of the plurality of computing devices to patch together a view of the corresponding environment from the content recorded by the second computing device and the content recorded by the one or more other computing devices.

20. The method of claim 17, wherein the first and second computing devices are head mounted displays, and wherein the corresponding environment is an extended reality (XR) environment.

* * * * *